(12) United States Patent
Erdmann et al.

(10) Patent No.: US 9,378,305 B1
(45) Date of Patent: *Jun. 28, 2016

(54) SELECTING PAGES IMPLEMENTING LEAF NODES AND INTERNAL NODES OF A DATA SET INDEX FOR REUSE

(71) Applicant: International Business Machines Corporation, Armonk, NY (US)

(72) Inventors: Derek L. Erdmann, Tucson, AZ (US); David C. Reed, Tucson, AZ (US); Thomas C. Reed, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/048,683

(22) Filed: Feb. 19, 2016

Related U.S. Application Data

(63) Continuation of application No. 13/619,962, filed on Sep. 14, 2012, now Pat. No. 9,305,112.

(51) Int. Cl.
  *G06F 17/30* (2006.01)
(52) U.S. Cl.
  CPC ............................... *G06F 17/30961* (2013.01)
(58) Field of Classification Search
  CPC .................................................. G06F 17/30961
  See application file for complete search history.

(56) References Cited

U.S. PATENT DOCUMENTS

| | | | |
|---|---|---|---|
| 5,261,088 A * | 11/1993 | Baird | ................ G06F 17/30961 |
| 7,197,620 B1 | 3/2007 | Adcock | |
| 7,831,573 B2 | 11/2010 | Lillibridge et al. | |
| 8,892,566 B2 | 11/2014 | Chen et al. | |
| 2002/0013887 A1 | 1/2002 | Ting | |
| 2008/0320235 A1 | 12/2008 | Beckmann et al. | |
| 2011/0106811 A1 | 5/2011 | Novoselsky et al. | |
| 2011/0246479 A1 | 10/2011 | Chen et al. | |
| 2014/0195708 A1 | 7/2014 | Klein et al. | |

FOREIGN PATENT DOCUMENTS

| | | |
|---|---|---|
| CN | 102207935 A | 10/2011 |
| KR | 20060135338 A | 12/2006 |

OTHER PUBLICATIONS

K. Gopinath, "Storage System NPTEL Course", Jan. 2012, Indian Institute of Science, Lecture 20, shttp://nptel.ac.in/courses/106108058/lec%2020.pdf.

Office Action dated Jan. 5, 2015, pp. 13, for U.S. Appl. No. 13/619,962, filed Sep. 14, 2012, (18A65).

Response dated Apr. 6, 2015, pp. 11, to Office Action dated Jan. 5, 2015, pp. 13, for U.S. Appl. No. 13/619,962, filed Sep. 14, 2012, (18465).

(Continued)

*Primary Examiner* — Eric S Cardwell
(74) *Attorney, Agent, or Firm* — David W. Victor; Konrad Raynes Davda & Victor LLP

(57) ABSTRACT

Provided are a computer program product, system, and method for selecting pages implementing leaf nodes and internal nodes of a data set index for reuse in memory. Pages in the memory are allocated to internal nodes and leaf nodes of a tree data structure representing all or a portion of a data set index for the data set. At least at least one duration parameter indicates an amount of time after which an unused page implement one of the internal nodes or leaf nodes is eligible for reuse. Selection is made of at least one selected page allocated to at least one of the leaf nodes and the internal nodes that has not been used for one of the at least one duration parameter for reuse.

15 Claims, 8 Drawing Sheets

(56) References Cited

OTHER PUBLICATIONS

Office Action dated Jul. 17, 2015, pp. 21, for U.S. Appl. No. 13/619,962, filed Sep. 14, 2012, (18A65).

Response dated Oct. 19, 2015, pp. 12, to Office Action dated Jul. 17, 2015, pp. 21, for U.S. Appl. No. 13/619,962, filed Sep. 14, 2012, (18465).

Notice of Allowance dated Dec. 14, 2015, pp. 5, for U.S. Appl. No. 13/619,962, filed 2012, (18.465).

Barr, et al., Translation Caching: Skip, Don't Walk (the Page Table), ACM 2010, pp. 1-12.

IBM Corp., "DFSMS Using Data Sets", Document No. SC26-7410-10, 1987, pp. 1-728.

English language machine translation of KR20060135338.

U.S. Pat. No. 8892566 is the English language counterpart of CN102207935.

\* cited by examiner

Page Information

Leaf Node Page

SELECTING PAGES IMPLEMENTING LEAF NODES AND INTERNAL NODES OF A DATA SET INDEX FOR REUSE

CROSS-REFERENCE TO RELATED APPLICATION

This application is a continuation of U.S. patent application Ser. No. 13/619,962, filed Sep. 14, 2012, which patent application is incorporated herein by reference in its entirety.

BACKGROUND OF THE INVENTION

1. Field of the Invention

The present invention relates to a computer program product, system, and method for selecting pages implementing leaf nodes and internal nodes of a data set index for reuse.

2. Description of the Related Art

A partitioned data set extended (PDSE) is a data set having an index and zero or more members. When adding new data for a new or existing member, the new data is appended sequentially to the end of the PDSE.

The PDSE index may be implemented in a tree data structure where pages allocated to the PDSE data sets are assigned to implement internal nodes and leaf nodes representing the data set index. Each leaf node represents one of the members and provides information on the member that may be used to access the member. Each internal node has one or more child leaf nodes. When a user seeks to access a member, the member name is presented and the tree is traversed to the internal node and leaf node representing the requested member using the member name as the index key. Member data is only loaded into the memory when accessed.

When a data set is opened, the entire data set index is loaded into the memory by assigning pages to implement all the internal and leaf nodes used to represent the entire data set index. A PDSE memory manager may use a Least Recently Used (LRU) algorithm to select pages for internal nodes and leaf nodes to make available for reuse to implement other leaf and internal nodes or store the data for the members in the memory. After internal and leaf nodes are selected for reuse according to the LRU algorithm, if a search of the index reaches a point where there is no page for the internal or leaf node, then the data set memory manager needs to assign a page to the internal and/or leaf nodes the user is trying to access while traversing through the nodes of the data set index.

There is a need in the art for improved techniques for managing pages in memory implementing leaf and internal nodes of a data set index.

SUMMARY

Provided are a computer program product, system, and method for selecting pages implementing leaf nodes and internal nodes of a data set index for reuse in memory. Pages in the memory are allocated to internal nodes and leaf nodes of a tree data structure representing all or a portion of a data set index for the data set, wherein the leaf nodes include information on members of the data set. The internal nodes include one or more keys used to traverse the tree data structure to reach the leaf nodes that are used to access the members of the data set. At least one page allocated to the leaf nodes and the internal nodes is selected based on durations during which the allocated pages have not been used. Pages allocated to the leaf nodes are selected for reuse at a higher rate than the pages allocated to the internal nodes. The selected at least one page is indicated as available for reuse.

DETAILED DESCRIPTION

Described embodiments provide techniques for selecting pages implementing leaf and internal nodes of a data set index to make available for reuse by selecting pages implementing leaf nodes at a higher rate than selecting pages implementing internal nodes. Described embodiments may utilize a leaf node duration and internal node duration to select leaf nodes and internal nodes, respectively, by determining the leaf and internal nodes that have been unused longer than the leaf node and internal node durations, respectively. Because internal nodes are more likely to be accessed than leaf nodes in a tree index, maintaining the pages implementing the internal nodes in the memory longer than pages implementing leaf nodes improves performance with respect to traversing the nodes of the data set index.

Figure 1:
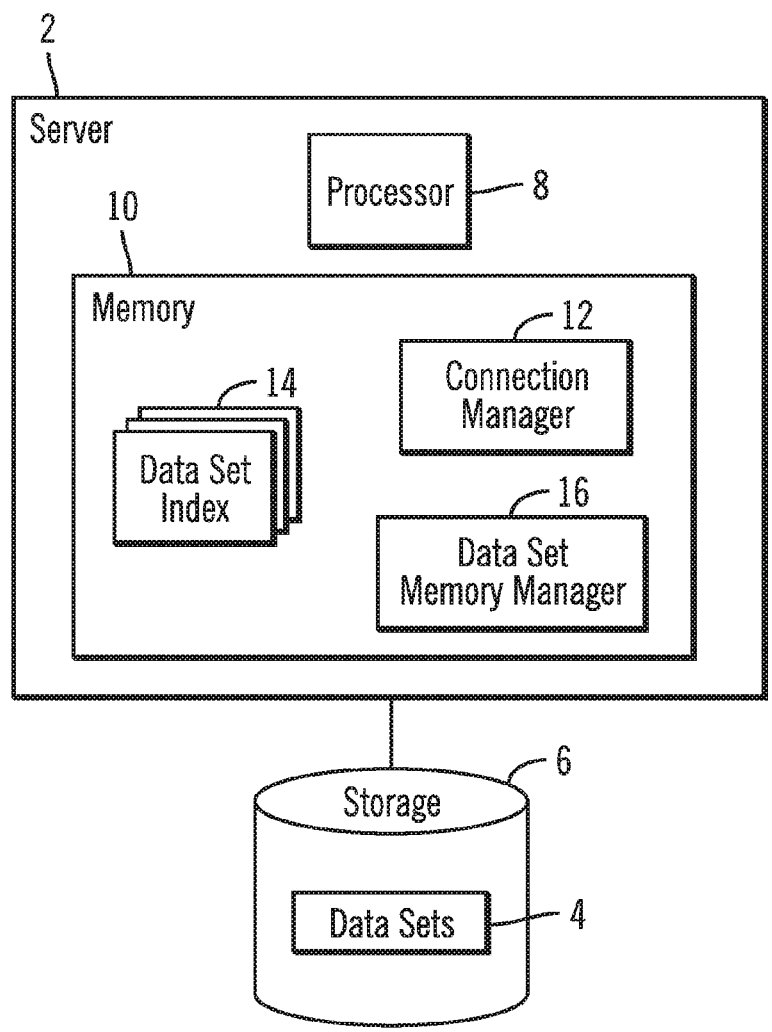
FIG. 1 illustrates an embodiment a computing environment.

FIG. 1 illustrates an embodiment of a computing environment. A plurality of hosts (not shown) may submit read and write requests to a server 2 to access data in data sets 4 in a storage 6. The server 2 includes a processor 8 and a memory 10 having a connection manager 12 program to manage read and write access to the data sets 4. The connection manager 12 may load data set indexes 14 into the memory for the data sets 4 that are opened for access. A data set memory manager 16 manages the use of pages of data in the memory 10 that are allocated to the connection manager 12 for data set operations. A specific number of pages may be allocated for data set operations. The pages allocated for data sets remain allocated even if not used. If additional pages are needed, the data set memory manager 16 may request additional pages to be allocated for data set operations. A page may comprise a fixed sized page allocated to store the data set indexes 14 and data set members.

In one embodiment, the memory 10 may comprise a volatile or non-volatile storage, such as a Dynamic Random Access Memory (DRAM), Random Access Memory (RAM) or a non-volatile memory, e.g., battery backed-up Random Access Memory (RAM), static RAM (SRAM), etc. The storage 6 may comprise an array of storage devices, such as a Just a Bunch of Disks (JBOD), Direct Access Storage Device (DASD), Redundant Array of Independent Disks (RAID) array, virtualization device, tape storage, flash memory, solid state storage devices (e.g., EEPROM (Electrically Erasable Programmable Read-Only Memory), flash memory, storage-class memory (SCM)), electronic memory, magnetic tape media, etc.

The connection manager 12 and data set memory manager 16 may comprise one or more programs loaded into the memory 10 that are executed by the processor 8 or may be implemented in one or more hardware devices in the server 2, such as in Application Specific Integrated Circuits (ASIC).

Figure 2:
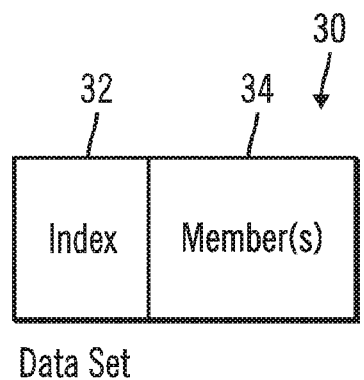
FIG. 2 illustrates a data set as known in the prior art.

FIG. 2 illustrates an embodiment of a data set 30, such as data sets 4, as known in the prior art, which includes an index 32 providing a location in the data set 30 of one or more members 34. A member comprises a range of tracks. In certain embodiments, the data sets 4 may comprise a Partitioned Data Set Extended (PDSE), where new data is written to the end of the data set and old versions of members are reused or deleted. In an alternative embodiment, the data sets 4 may comprise a type of data set other than a PDSE.

Figure 3:
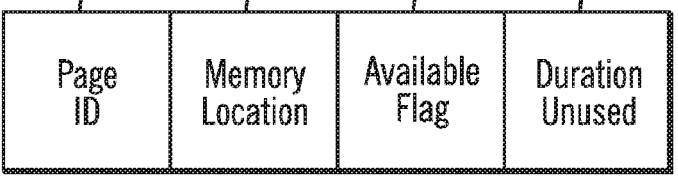
FIG. 3 illustrates an embodiment of page information providing information on a page implementing a node of the data set index.

FIG. 3 illustrates an embodiment of page information 50 the data set memory manager 16 uses to manage the pages allocated for data sets 4. The page information 50 for each page indicates a page identifier (ID) 52; a memory location 54 in the memory 10 of the page; an available flag 56 indicating whether the page is available for use for data sets or is currently being used to store data set index 14 or data set member 34 data; and a duration unused 58 indicating a duration of time during which the page 52 has not been used, i.e., is available. The duration unused 58 may be expressed in a number of memory clock cycles or other time value.

The data set index 14 may be implemented as a representation of a tree structure having leaf nodes and internal nodes (also known as non-leaf nodes). There may be one page in the memory 10 allocated to each node, leaf and internal. Each leaf node may provide information on the members 34 of a data set 4 used to access the members 34. The internal nodes include one or more keys and links to one or more leaf nodes. The keys of the internal nodes are used traverse the tree structure representing the data set index 14 to access the leaf nodes having the information on data set members 34. The keys in the internal nodes used to access the leaf nodes may comprise characters or character strings for member 34 names. Alternatively, the keys may comprise other values used to access leaf nodes for members 34 being accessed.

Figure 4:
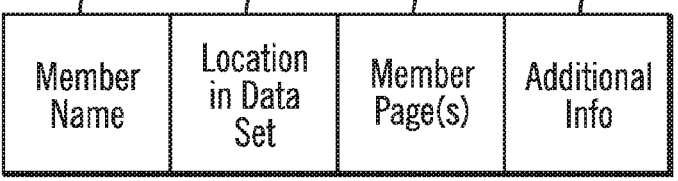
FIG. 4 illustrates an embodiment of leaf node information maintained in the page implementing a leaf node.

FIG. 4 illustrates an embodiment of a leaf node page 70 having a member name 72 of the data set member 34; a location in the data set 74 of the member 72; the one or more member pages 76 in the memory 10 having the data for the member 72; and additional information 78 on the member, such as user data, attributes, statistics, and status.

In one embodiment, the member names 72 may be used to index the members 34 in the tree structure. For instance, the internal nodes may have keys related to characters in a member name that are used to determine a link to the appropriate leaf node page 70 based on the member name 72 when searched. An internal node may have a number of child leaf nodes that is one greater than the number of member name keys maintained in the internal node to index the child leaf nodes.

Figure 5:
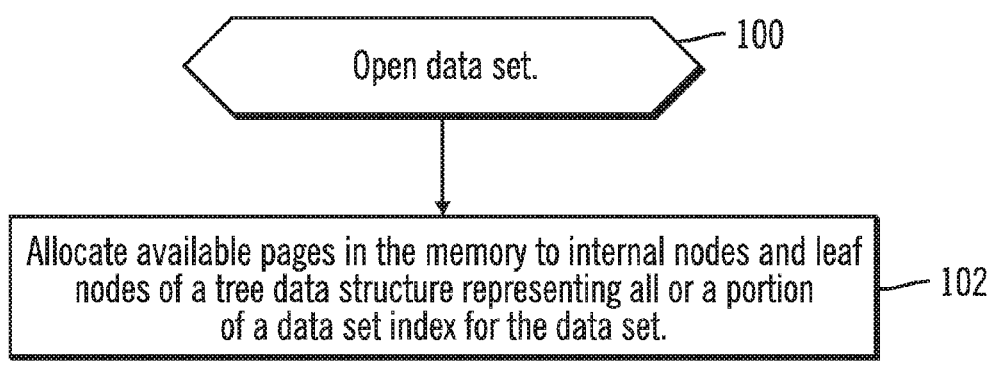
FIG. 5 illustrates an embodiment of operations to open a data set.

FIG. 5 illustrates an embodiment of operations performed by the connection manager 100 and/or data set memory manager 16 to open a data set 4. Upon receiving (at block 100) a request by a host to open a data set, the data set memory manager 16 is called to allocate (at block 102) available pages in the memory 10 to internal nodes and leaf nodes of a tree data structure representing all or a portion of a data set index 14 for the data set 4 to open. The connection manager 12 would perform various other operations to open the data set 4 and make available for access to hosts. In certain embodiments, the connection manager 12 may initially load the entire data set index 14 into the memory 6. In an alternative embodiment, the connection manager 12 may load only a portion of the data set index 14 into the memory, such as just the root and internal nodes.

Member 34 data is only loaded into memory pages when a user accesses the leaf node 70 in the data set index 14 representing the member 34. The one or more member pages 76 used to store the member 34 data are indicated in the member page(s) 76 having the member 34 data.

Figure 6:
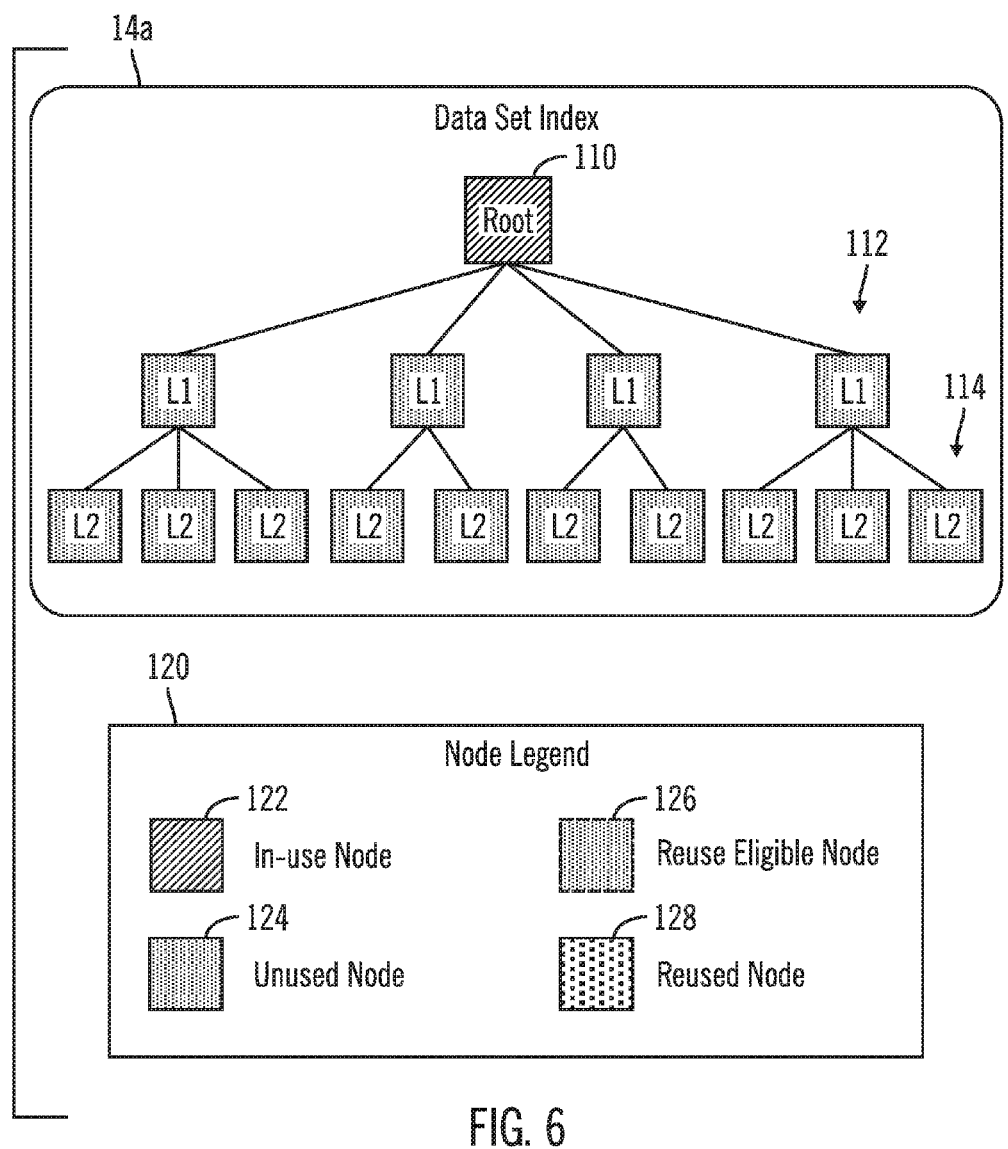
FIG. 6 illustrates an embodiment of a data set index and node legend for the nodes in the data set index.

FIG. 6 illustrates pages in the memory 10 forming nodes of a data set index 14a, including a root node 110, labeled as the root, a plurality of internal nodes 112 labeled as L1 or level 1 nodes, and a plurality of leaf nodes 114, labeled as L2 or level 2 nodes. A node legend 120 shows node shading representing different node states, including an "in-use node" state 122, which means that the node is currently being accessed as part of a read or write operation directed to a member 34 of a data set 4; an "unused node" state 124, which means the node is not currently being accessed but is still being used to implement a leaf or internal node of a data set index 4; a "reuse eligible" state 126, which means the page for that node is available to be reused for data set index and data set data; and a "reused node" state 128, which means a page previously used for a node that previously had the reuse eligible state 126 that is selected to use to implement a leaf or internal node of a data set index 14.

FIG. 6 shows all the nodes of the data set index 14a loaded into the memory 10 after the data set 14 is opened, where the nodes initially have the unused node state 124 after open. A leaf node L2 is accessed to access the member 34 associated with the leaf node L2. Internal nodes L1 are traversed to reach a leaf node L1 having the member name 72 that is to be accessed. The root node 110 always remains in the in-use node state 122 while the data set 4 for the data set index 14a is open.

Although in certain embodiments there may be only two levels of nodes, with one level of internal nodes 112, such as shown in FIG. 6, in further embodiments there may be multiple levels of internal nodes having keys for the member names that are traversed to access the leaf node 114 having the member name 72 to access.

Figure 7:
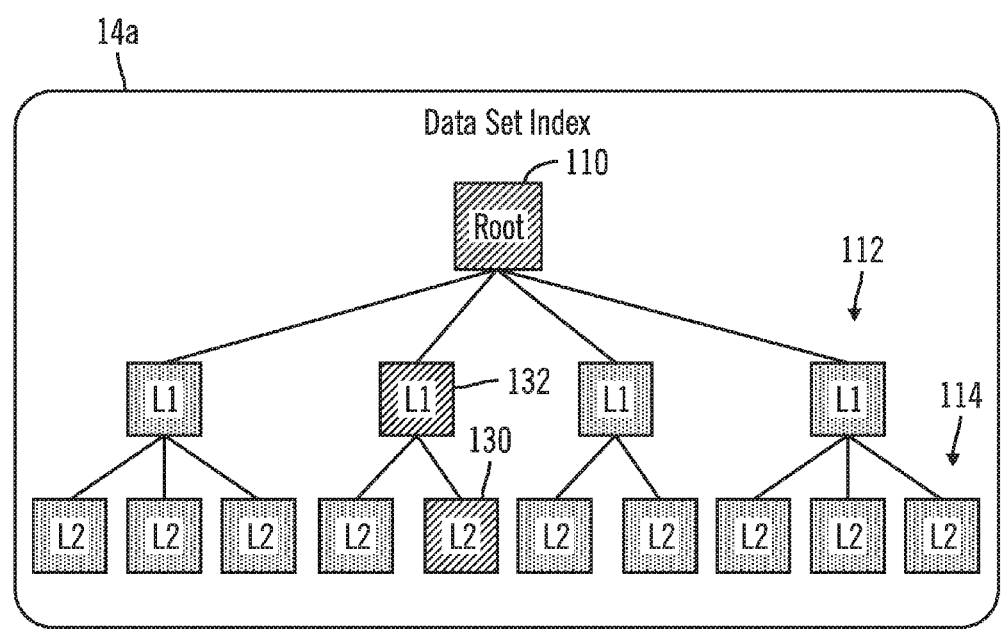
FIG. 7 illustrates a further embodiment of a data set index.

FIG. 7 shows all the nodes of the data set index 14a after the leaf node 130 has been accessed by traversing internal node 132 in order to access the member 34 identified in the leaf node 130. The nodes 130 and 132 are shown in the in-use node state 122, whereas all other internal and leaf nodes are shown in the unused node state 124.

Figure 8:
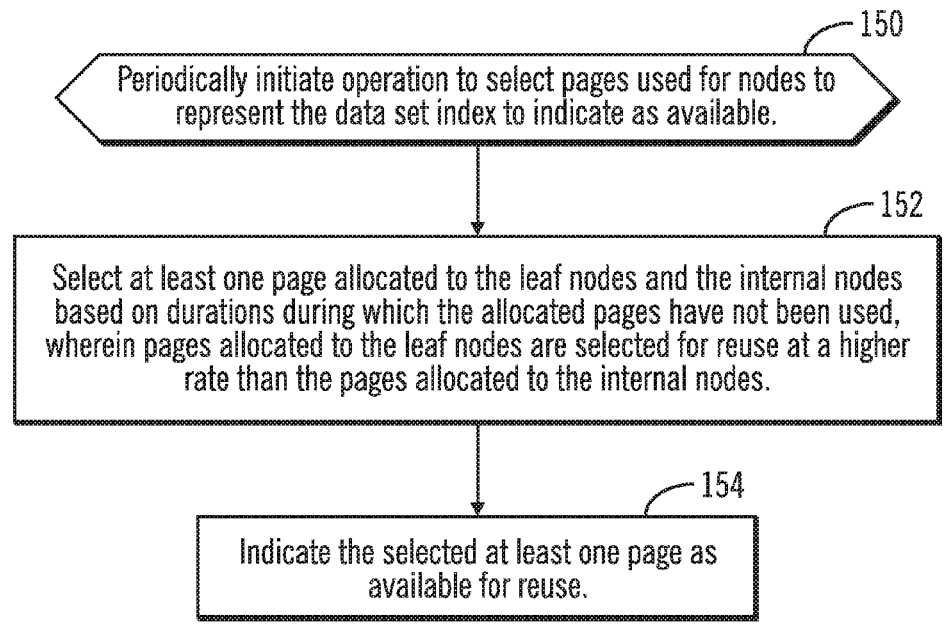
FIG. 8 illustrates an embodiment of operations to select pages for nodes to make available for reuse.

FIG. 8 illustrates an embodiment of operations performed by the data set memory manager 16 to select internal 112 and leaf nodes 114 to make available for reuse. The data set memory manager 16 periodically initiates (at block 150) an operation to select pages used to implement the data set index nodes to indicate as available. The data set memory manager 16 selects (at block 152) at least one page implementing the leaf nodes 114 and the internal nodes 112 based on durations 58 (FIG. 3) during which the pages have not been used. In certain embodiments, pages implementing the leaf nodes 114 are selected for reuse at a higher rate than the pages implementing the internal nodes 112. Selecting pages for leaf nodes 114 at a higher rate than internal nodes 112 optimizes the number of available pages allocated for the data set indexes 14 because the internal nodes 112 have a greater likelihood of being accessed because each internal node 112 is linked to one or more leaf nodes 114. In this way, pages assigned to internal nodes 112 remain in the memory 10 longer for use to traverse to the leaf nodes 114.

The selected at least one page is indicated (at block 154) as available for reuse, such as by indicating availability in the available flag 56 of the page information 50 for the selected pages. The page indicated as available for reuse would be in the reuse eligible state 126.

In one embodiment the periodic operation to select pages may be performed at a lower rate than the rates at which the unused internal nodes 112 and leaf nodes 114 are selected for reuse in order to provide sufficient time for both internal 112 and leaf 114 nodes to be eligible for reuse.

Figure 9:
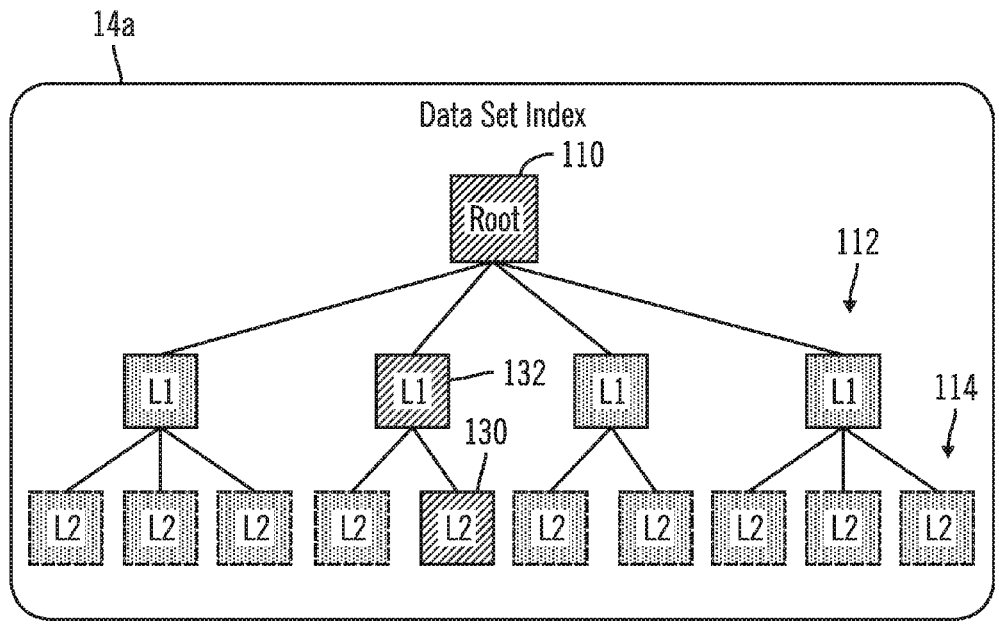
FIG. 9 illustrates an embodiment of a data set index.

FIG. 9 shows all the nodes of the data set index 14a after all the previously unused leaf nodes 114 have been selected to make a available for reuse, which means they are in the reuse eligible state 126. The unused internal nodes 112 have not yet been selected to make available for reuse because the unused leaf nodes 114 are selected for reuse at a higher rate than the unused internal nodes 112.

Figure 10:
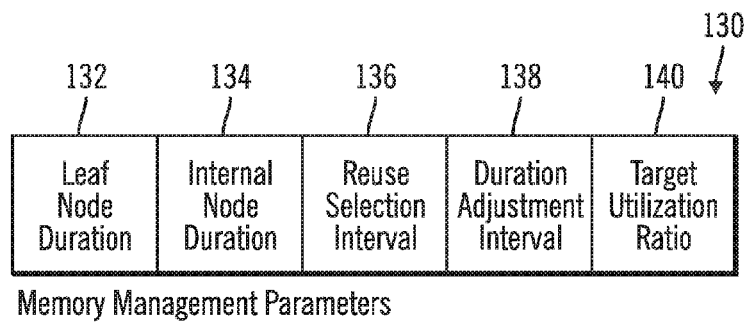
FIG. 10 illustrates an embodiment of memory management parameters.
Figure 13:
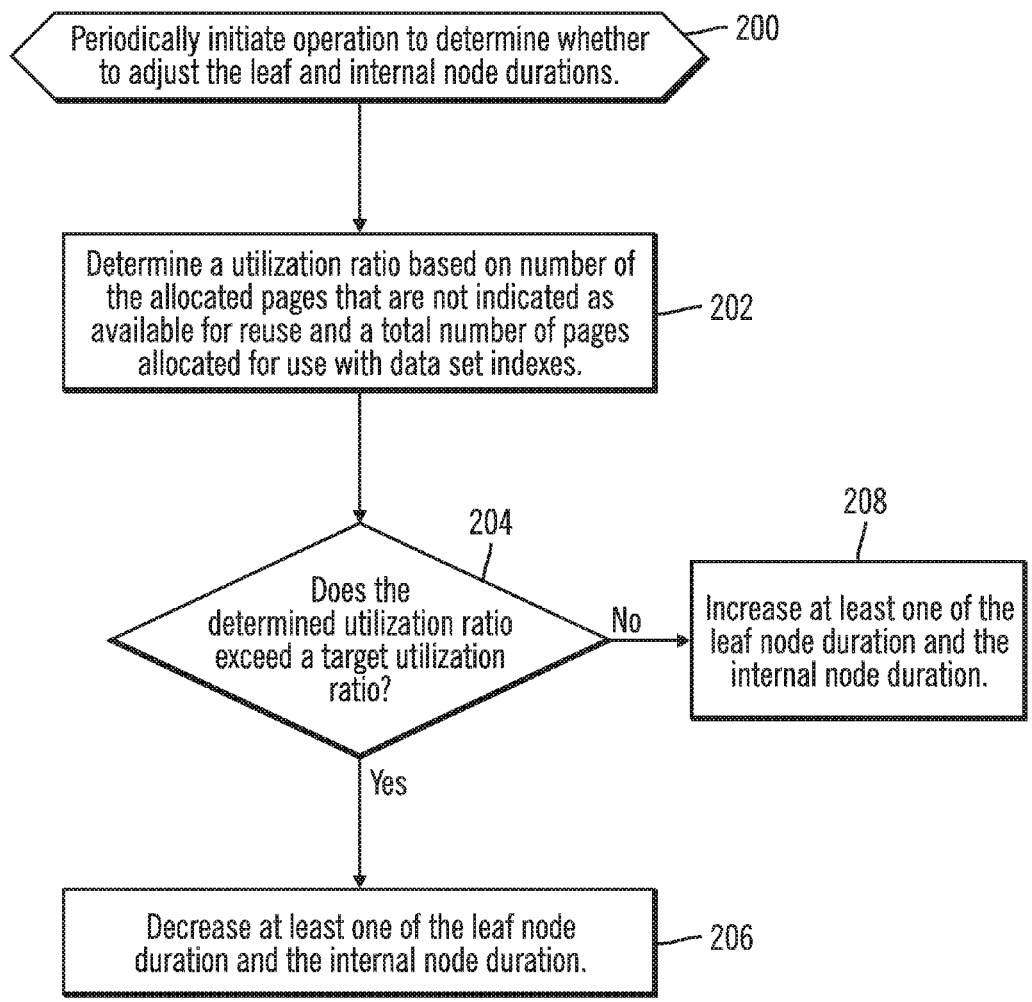
FIG. 13 illustrates an embodiment of operations to adjust the leaf and internal node durations.

FIG. 10 illustrates an embodiment of memory management parameters 130 used by the data set memory manager 16 to select pages implementing internal nodes 112 and leaf nodes 114 to make available for reuse. A leaf node duration 132 indicates an amount of time or clock cycles (system or memory) after which unused pages implementing leaf nodes 114 are eligible for reuse. A internal node duration 134 indicates an amount of time or clock cycles (system or memory) after which unused pages implementing internal nodes 112 are eligible for reuse. The internal node duration 134 is temporal greater than the leaf node duration 132 to cause the unused leaf nodes 114 to be selected at a higher rate for reuse than unused internal nodes 112. A reuse selection duration 136 indicates an interval at which the operations of FIG. 8 are periodically performed. A duration adjustment interval 138 indicates an interval at which the operations of FIG. 13 are periodically performed to adjust the leaf node 132 and internal node 134 durations. A target utilization ratio 140 indicates a high water mark percentage of pages allocated to the connection manager 12 for data set operations that are not available for reuse used to determine whether to adjust the leaf node 132 and internal node 134 durations.

Figure 11:
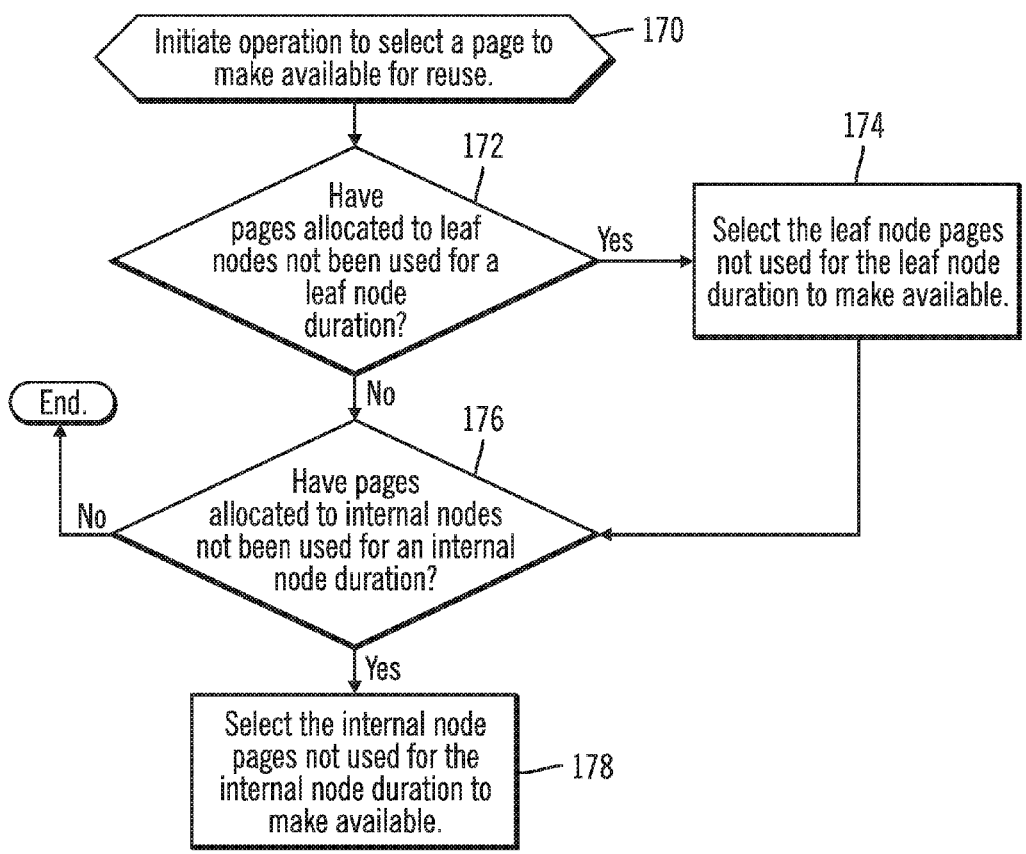
FIG. 11 illustrates an embodiment of operations to select a page implementing nodes for reuse.

FIG. 11 illustrates an embodiment of operations performed by the data set memory manager 16 to perform the operation at block 152 in FIG. 8 in the embodiment where there are leaf node 132 and internal node 134 durations used to determine whether to make pages available for reuse for leaf 114 and internal nodes 112, respectively. Upon initiating (at block 170) the operation to select a page used to implement an internal node 112 or leaf node 114 of a data set index 14, such as after the reuse selection interval 136, the data set memory manager 16 determines (at block 172) whether there are pages allocated to leaf nodes 114 that have not been used for the leaf node duration 132. This may be performed by determining whether the duration not used 58 field in the page information 50 (FIG. 3) for leaf nodes 114 that are not available, as indicated in the available flag 56 of the page information 50, exceeds the leaf node duration 132. Those pages implementing leaf nodes 114 having a duration not used 58 value exceeding the leaf node duration 132 are selected (at block 174) to make available, such as by indicating available in the available flag 56 of the page information 50 for the pages for the selected leaf nodes 114.

From the no branch of block 172 or from block 174, the data memory manager 16 determines (at block 176) whether there are pages allocated to internal nodes 112 that have not been used for the internal node duration 134. This may be performed by determining whether the duration not used 58 field in the page information 50 (FIG. 3) for the internal nodes 112 that are not available, as indicated in the available field 56 of the page information 50, exceeds the internal node duration 134. Those pages implementing internal nodes 112 having a duration not used 58 exceeding the internal node duration 134 are selected (at block 178) to make available, such as by indicating available in the available flag 56 of the page information 50 for the pages for the selected internal nodes 112. Once indicated as available in the available field 56, that available page allocated to data sets operations is available for reuse as a node in a data set index 14 or for reuse to store data for a data set member 34.

As discussed, the leaf node duration 132 is less than the internal node duration 134 to cause the pages implementing leaf nodes 114 to be selected for reuse at a higher rate than the pages for internal nodes 112. Further, the reuse selection interval 136 between performing the operations in FIG. 8 may be greater than the leaf node 132 and the internal node 134 durations to ensure that there has been an opportunity for pages implementing internal 112 and leaf 114 nodes to have been unused for a duration that exceeds the leaf node 132 and the internal node 134 durations, respectively.

In one embodiment, the duration not used 58 may be expressed as a number of memory 10 clock cycles and the leaf node and internal node durations may comprise a number of clock cycles. The internal node duration 134 may comprise a greater number of clock cycles than the leaf node duration 132 to cause the pages implementing leaf nodes 114 to be selected at a higher rate than the pages implementing the internal nodes 112.

Figure 12:
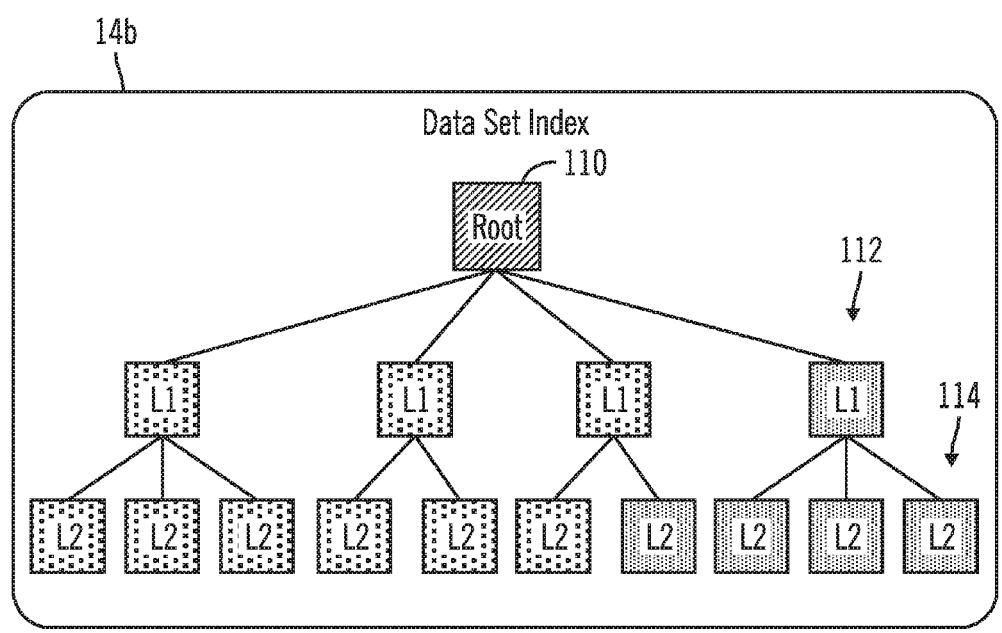
FIG. 12 illustrates an embodiment of a data set index.

When a new data set is opened, the pages for the reuse eligible nodes 124 of the currently opened data set 14a, shown in FIG. 9 in the reuse eligible state 126, may be selected for use to implement the nodes of a newly opened or previously opened data set. FIG. 12 shows a newly opened data set 14b, opened after data set index 14a was opened, using pages for nodes from data set index 14a that were made reuse eligible 124 as shown in FIG. 9. The pages for the nodes in data set index 14b in FIG. 12 that are shaded to represent a reused node state 128 comprise pages previously used for nodes in data set index 14a that are reused in data set index 14b. Thus, FIG. 12 shows how pages for nodes made reuse eligible 124 from data set index 14a are reused for nodes in the newly opened data set index 14b. Reuse eligible nodes may also be used for leaf and internal nodes that need to be loaded into memory for a currently opened data set 4.

FIG. 13 illustrates an embodiment of operations performed by the data set memory manager 16 to adjust the leaf node 132 and internal node 134 durations used to select pages to make available for reuse, reuse eligible 126, which is performed every duration adjustment interval 138. Upon periodically initiating (at block 200) the duration adjustment operation, the data set memory manager 16 determines (at block 202) a utilization ratio based on a number of the pages allocated to the connection manager 12 that are not indicated as available for reuse and a total number of pages allocated for use by the connection manager 12. If (at block 204) the determined utilization ratio exceeds the target utilization ratio 140, then at least one of the leaf node duration 132 and the internal node duration 134 are decreased (at block 206) to increase the rate at which the pages implementing leaf and internal nodes are selected to make available for reuse because the determination at block 204 indicates that there are relatively too few pages allocated to the connection manager 12 that are available.

If (at block 204) the determined utilization ratio does not exceed the target utilization ratio 140, then at least one of the leaf node duration 132 and the internal node duration 134 are increased (at block 208) to decrease the rate at the pages implementing the leaf 114 and internal 112 nodes are selected to make available because there are relatively too many pages allocated to the connection manager 12 that are available.

There may be multiple utilization ratios to provide for variable increase and decreases in the leaf node 132 and internal node 134 durations, so that at higher and lower ratios of available pages, there may be higher percentage increases and decreases in the durations 132, 134. Further, there also may be a high target utilization ratio that if exceeded causes the data set memory manager 16 to request that more pages be allocated to the connection manager 12 for data set operations.

Described embodiments provide for the selection of pages implementing internal and leaf nodes of a data set index that selects leaf nodes to make available for reuse at a higher rate than the selection of pages implementing internal nodes. By selecting the leaf nodes at a higher rate, index access is optimized because the node type more likely to be accessed, the internal nodes, remain in memory longer than the leaf nodes less likely to be randomly accessed. Certain embodiments utilize a leaf node duration and internal node duration to use to select pages implementing leaf and internal nodes to make available for reuse, where the leaf node duration is greater than the internal node duration to provide for a higher rate of selection of the leaf nodes over the internal nodes. Further, described embodiments provide techniques for adjusting the leaf and internal node durations based on a utilization of pages allocated to data set operations.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing a data set stored in a storage in a memory, the computer program product comprising a non-transitory computer readable storage medium having computer readable program code embodied therein that executes to perform operations, the operations comprising:

allocating pages in the memory to internal nodes and leaf nodes of a tree data structure representing all or a portion of a data set index for the data set;

maintaining a leaf node duration and an internal node duration, wherein the leaf node duration indicates an amount of time after which an unused page allocated to one of the leaf nodes is eligible for reuse and wherein the internal node duration indicates an amount of time after which an unused page allocated to one of the internal nodes is eligible for reuse, wherein the internal node duration comprises a greater temporal duration than the leaf node duration to cause the leaf nodes to be selected at a higher rate for reuse than the internal nodes; and selecting at least one selected page allocated to at least one of the leaf nodes and the internal nodes that has not been used for one of the at least one of the leaf node duration and the internal node duration, respectively, for reuse.

2. The computer program product of claim 1, wherein the leaf nodes include information on members of the data set, wherein the internal nodes include one or more keys used to traverse the tree data structure to reach the leaf nodes that are used to access the members of the data set.

3. The computer program product of claim 1, wherein the operations further comprise:

determining whether a utilization rate indicating an amount of the pages that are not available for reuse to be allocated to leaf nodes and internal nodes exceeds a threshold; and decreasing at least one of the leaf node duration and the internal node duration in response to determining that the utilization rate exceeds the threshold.

4. The computer program product of claim 3, wherein the operations further comprise:

increasing at least one of the leaf node duration and the internal node duration in response to determining that the utilization rate does not exceed the threshold.

5. The computer program product of claim 3, wherein the utilization rate is based on a number of the pages allocated to the leaf nodes and the internal nodes not indicated as available for reuse and a total number of pages allocated.

6. A system for managing a data set stored in a storage, comprising:

a processor;

a memory;

a computer readable storage medium having code executed by the processor to perform operations, the operations comprising:

allocating pages in the memory to internal nodes and leaf nodes of a tree data structure representing all or a portion of a data set index for the data set;

maintaining a leaf node duration and an internal node duration, wherein the leaf node duration indicates an amount of time after which an unused page allocated to one of the leaf nodes is eligible for reuse and wherein the internal node duration indicates an amount of time after which an unused page allocated to one of the internal nodes is eligible for reuse, wherein the internal node duration comprises a greater temporal duration than the leaf node duration to cause the leaf nodes to be selected at a higher rate for reuse than the internal nodes; and selecting at least one selected page allocated to at least one of the leaf nodes and the internal nodes that has not been used for one of the at least one of the leaf node duration and the internal node duration, respectively, for reuse.

7. The system of claim 6, wherein the leaf nodes include information on members of the data set, wherein the internal nodes include one or more keys used to traverse the tree data structure to reach the leaf nodes that are used to access the members of the data set.

8. The system of claim 6, wherein the operations further comprise:

determining whether a utilization rate indicating an amount of the pages that are not available for reuse to be allocated to leaf nodes and internal nodes exceeds a threshold; and decreasing at least one of the leaf node duration and the internal node duration in response to determining that the utilization rate exceeds the threshold.

9. The system of claim 8, wherein the operations further comprise:

increasing at least one of the leaf node duration and the internal node duration in response to determining that the utilization rate does not exceed the threshold.

10. The system of claim 8, wherein the utilization rate is based on a number of the pages allocated to the leaf nodes and the internal nodes not indicated as available for reuse and a total number of pages allocated.

11. A method, comprising:

allocating pages in a memory to internal nodes and leaf nodes of a tree data structure in a non-transitory computer readable storage medium representing all or a portion of a data set index for a data set;

maintaining a leaf node duration and an internal node duration, wherein the leaf node duration indicates an amount of time after which an unused page allocated to one of the leaf nodes is eligible for reuse and wherein the internal node duration indicates an amount of time after which an unused page allocated to one of the internal nodes is eligible for reuse, wherein the internal node duration comprises a greater temporal duration than the leaf node duration to cause the leaf nodes to be selected at a higher rate for reuse than the internal nodes; and selecting at least one selected page allocated to at least one of the leaf nodes and the internal nodes that has not been used for one of the at least one of the leaf node duration and the internal node duration, respectively, for reuse.

12. The method of claim 11, wherein the leaf nodes include information on members of the data set, wherein the internal nodes include one or more keys used to traverse the tree data structure to reach the leaf nodes that are used to access the members of the data set.

13. The method of claim 11, further comprising:

determining whether a utilization rate indicating an amount of the pages that are not available for reuse to be allocated to leaf nodes and internal nodes exceeds a threshold; and decreasing at least one of the leaf node duration and the internal node duration in response to determining that the utilization rate exceeds the threshold.

14. The method of claim 13, further comprising:

increasing at least one of the leaf node duration and the internal node duration in response to determining that the utilization rate does not exceed the threshold.

15. The method of claim 13, wherein the utilization rate is based on a number of the pages allocated to the leaf nodes and the internal nodes not indicated as available for reuse and a total number of pages allocated.

\* \* \* \* \*